United States Patent
Feng et al.

(10) Patent No.: US 12,276,877 B2
(45) Date of Patent: Apr. 15, 2025

(54) ARRAY SUBSTRATE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Bo Feng, Beijing (CN); Shijun Wang, Beijing (CN); Yang Wang, Beijing (CN); Zhan Wei, Beijing (CN); Wenkai Mu, Beijing (CN); Yi Liu, Beijing (CN); Li Tian, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 18/434,968

(22) Filed: Feb. 7, 2024

(65) Prior Publication Data

US 2024/0231139 A1   Jul. 11, 2024

Related U.S. Application Data

(63) Continuation of application No. 17/427,348, filed as application No. PCT/CN2021/074936 on Feb. 2, 2021, now Pat. No. 11,934,060.

(30) Foreign Application Priority Data

Feb. 28, 2020   (CN) .......................... 202010127377.9

(51) Int. Cl.
G02F 1/1333   (2006.01)
G02F 1/1362   (2006.01)
(Continued)

(52) U.S. Cl.
CPC .... *G02F 1/13338* (2013.01); *G02F 1/136286* (2013.01); *G06F 3/0412* (2013.01); *G06F 3/0443* (2019.05)

(58) Field of Classification Search
CPC ...... G02F 1/136286; G09G 2300/0426; H10K 59/131
See application file for complete search history.

(56) References Cited

U.S. PATENT DOCUMENTS

2012/0146964 A1* 6/2012 Kim .................. G09G 3/3688
345/204
2012/0154308 A1   6/2012 Jeon et al.
(Continued)

FOREIGN PATENT DOCUMENTS

CN   101387804 A   3/2009
CN   103926766 A   7/2014
(Continued)

OTHER PUBLICATIONS

Jian, English translation for CN-110989865-A (Year: 2020).*
(Continued)

*Primary Examiner* — Jonathan Y Jung
(74) *Attorney, Agent, or Firm* — Lippes Mathias LLP

(57) ABSTRACT

Provided is an array substrate. The array substrate includes: a base substrate, and a plurality of gate lines, a plurality of data lines, a plurality of sub-pixels and a plurality of touch signal lines disposed on the base substrate. The data lines have a plurality of first extending parts and a plurality of second extending parts which are in an alternating arrangement. When the array substrate is used to prepare a liquid crystal display panel and the liquid crystal display panel is displaying, in each column of the sub-pixels, the voltage polarities of the two adjacent sub-pixels which respectively belong to two adjacent first pixel regions are opposite.

14 Claims, 8 Drawing Sheets

(51) Int. Cl.
*G06F 3/041* (2006.01)
*G06F 3/044* (2006.01)

(56) References Cited

U.S. PATENT DOCUMENTS

| | | | |
|---|---|---|---|
| 2015/0042916 A1 | 2/2015 | Xu et al. | |
| 2016/0274716 A1 | 9/2016 | Liu et al. | |
| 2017/0108745 A1 | 4/2017 | Jia et al. | |
| 2018/0260058 A1* | 9/2018 | Zhan | G02F 1/134309 |
| 2019/0129258 A1* | 5/2019 | Liu | G06F 3/0412 |
| 2019/0179440 A1* | 6/2019 | Beak | G06F 3/04164 |
| 2020/0081309 A1 | 3/2020 | Lee et al. | |
| 2021/0124461 A1* | 4/2021 | Tominaga | G02F 1/1368 |
| 2022/0035212 A1 | 2/2022 | Wang et al. | |

FOREIGN PATENT DOCUMENTS

| | | | |
|---|---|---|---|
| CN | 104020893 A | 9/2014 | |
| CN | 105159001 A | 12/2015 | |
| CN | 107765489 A | 3/2018 | |
| CN | 110456586 A | 11/2019 | |
| CN | 110806668 A | 2/2020 | |
| CN | 110989865 A * | 4/2020 | G06F 3/0412 |
| CN | 211348942 U | 8/2020 | |

OTHER PUBLICATIONS

International search report of PCT application No. PCT/CN2021/074936 issued on May 7, 2021.
Extended European search report of counterpart European application No. 21760015.4 issued on Jul. 19, 2023.
Non-final office Action of U.S. Appl. No. 17/427,348 issued on Aug. 9, 2023.
Notice of allowance of U.S. Appl. No. 17/427,348 issued on Nov. 9, 2023.

* cited by examiner

ARRAY SUBSTRATE AND DISPLAY DEVICE

CROSS-REFERENCE TO RELATED APPLICATION

This application is a continuation of U.S. patent application Ser. No. 17/427,348, filed Jul. 30, 2021, which is a 371 of PCT Application No. PCT/CN2021/074936, filed Feb. 2, 2021, which claims priority to Chinese Patent Application No. 202010127377.9, filed on Feb. 28, 2020 and entitled "ARRAY SUBSTRATE AND DISPLAY DEVICE", the disclosures of which are herein incorporated herein by reference in its entirety.

TECHNICAL FIELD

The present disclosure relates to an array substrate and a display device.

BACKGROUND

Full-screen display devices have a relatively high screen-to-body ratio (which may generally reach 80%, or even more than 90%), and thus larger display screens can be provided without increasing the overall size of the display devices.

SUMMARY

Embodiments of the present disclosure provide an array substrate and a display device. The technical solutions are provided as follows.

In one aspect, an array substrate is provided. The array substrate includes:
 a base substrate;
 a plurality of gate lines and a plurality of data lines disposed on the base substrate, wherein the data lines and the gate lines define a plurality of first pixel regions on the base substrate; the plurality of first pixel regions are arranged in multiple rows, and two of the gate lines are arranged between every two adjacent rows of first pixel regions; the data lines have a plurality of first extending parts and a plurality of second extending parts that are in connection; the plurality of first extending parts and the plurality of second extending parts are in a one-by-one alternating arrangement; an extending direction of each first extending part intersects an extending direction of every second extending part which is connected with the first extending part, and every two adjacent first extending parts and a second extending part between the two adjacent first extending parts in a same data line constitute a bending structure, wherein a region enclosed by the bending structure includes at least one of the first pixel regions;
 two sub-pixels disposed in each first pixel region, wherein the two sub-pixels are arranged along an extending direction of the gate lines; the two sub-pixels are respectively connected with two of the data lines which are adjacent to the first pixel region; and the sub-pixels are connected with one of the two gate lines which are adjacent to the sub-pixels; and
 a plurality of touch signal lines disposed on the base substrate, wherein the plurality of first pixel regions are further arranged in multiple columns, each column of the first pixel regions including two columns of the sub-pixels; and the touch signal lines are disposed between two columns of the sub-pixels in a same column of the first pixel regions.

Optionally, the plurality of first extending parts and the plurality of second extending parts in a same data line constitute a plurality of the bending structures, the bending structures have openings, and the openings of every two adjacent bending structures are opposite in orientation.

Optionally, an extending direction of the first extending parts is the same with the extending direction of the gate lines; an extending direction of the second extending parts is perpendicular to the extending direction of the gate lines; and an extending direction of the touch signal lines is perpendicular to the extending direction of the gate lines.

Optionally, an orthographic projection of the first extending parts onto the base substrate and an orthographic projection of the gate lines onto the base substrate do not overlap.

Optionally, the first extending parts are disposed between two gate lines between two adjacent rows of the first pixel regions.

Optionally, the data lines and the gate lines further define a plurality of second pixel regions on the base substrate; the plurality of second pixel regions are arranged in two columns; the multiple columns of first pixel regions are disposed between the two columns of the second pixel regions; and the array substrate further includes one sub-pixel located in the second pixel regions.

Optionally, each of the touch signal lines includes first touch line segments and second touch line segments that are in an alternating arrangement; the first touch line segments and the second touch line segments are disposed in different layers, and each first touch line segment is connected with the second touch line segment adjacent to the first touch line segment; the first touch line segments are disposed in a same layer as the data lines, and orthographic projections of the second touch line segments onto the base substrate intersect orthographic projections of the data lines onto the base substrate.

Optionally, the array substrate further includes a first insulating layer disposed between the first touch line segments and the second touch line segments, wherein the first insulating layer is provided with a plurality of first via holes; and the first touch line segment is connected with an adjacent second touch line segment through at least one of the first via holes.

Optionally, the plurality of touch signal lines are disposed in a same layer, and the plurality of touch signal lines and the data lines are disposed in different layers.

Optionally, the array substrate further includes a plurality of touch electrodes, wherein the plurality of touch electrodes are connected with the plurality of touch signal lines in a one to one correspondence.

Optionally, the touch electrodes and the plurality of touch signal lines are disposed in different layers; the array substrate further includes a second insulating layer disposed between the touch electrodes and the plurality of touch signal lines; the second insulating layer is provided with a plurality of second via holes; and each of the touch electrodes is connected with the corresponding touch signal line through at least one of the second via holes.

Optionally, the touch electrodes are multiplexed as common electrodes in the array substrate; and the touch signal lines are multiplexed as common electrode lines in the array substrate.

Optionally, the touch electrodes are block electrodes; the sub-pixels include pixel electrodes; and an orthographic projection of the touch electrode onto the base substrate covers an orthographic projections of the plurality of pixel electrodes onto the base substrate.

Optionally, the multiple columns of first pixel regions and the plurality of touch signal lines are in a one-to-one correspondence; and each of the touch signal lines is located between two columns of sub-pixels of one column of first pixel regions which corresponds to the touch signal line.

Optionally, the array substrate includes a first conductive layer, a gate insulating layer, an active layer, a second conductive layer, a pixel electrode layer, a first insulating layer, a third conductive layer, a second insulating layer and a fourth conductive layer, which are sequentially stacked along a direction perpendicular to and away from the base substrate;

wherein, the first conductive layer includes the gate lines and gate electrodes; the second conductive layer includes the data lines, the first touch line segments, source electrodes and drain electrodes; the third conductive layer includes the second touch line segments; and the fourth conductive layer includes the touch electrodes.

Optionally, the array substrate includes a first conductive layer, a gate insulating layer, an active layer, a second conductive layer, a pixel electrode layer, a first insulating layer, a third conductive layer, a second insulating layer and a fourth conductive layer, which are sequentially stacked along a direction perpendicular to and away from the base substrate;

wherein the first conductive layer includes the gate lines and gate electrodes; the second conductive layer includes the data lines, source electrodes and drain electrodes; the third conductive layer includes the touch signal lines; and the fourth conductive layer includes the touch electrodes.

Optionally, the region enclosed by the bending structure includes a plurality of first pixel regions, and an arrangement direction of the plurality of first pixel regions is perpendicular to the extending direction of the gate lines.

Optionally, the two sub-pixels disposed in each of the first pixel regions are respectively two sub-pixels among a red sub-pixel, a green sub-pixel or a blue sub-pixel; the sub-pixels in a same row are arranged periodically in an order of the red sub-pixel, the green sub-pixel and the blue sub-pixel; and the sub-pixels in a same column have a same color.

Optionally, each of the sub-pixels includes a thin film transistor and a pixel electrode; and the thin film transistor includes a first electrode, a second electrode, and a gate electrode; the first electrode is connected with one of the data lines; the second electrode is connected with the pixel electrode; and the gate electrode is connected with one of the gate lines.

In another aspect, a display device is provided. The display device includes any of the above array substrate, a color filter substrate and a liquid crystal layer located between the array substrate and the color filter substrate.

DETAILED DESCRIPTION

For clearer descriptions of the objectives, technical solutions, and advantages of the present disclosure, embodiments of the present disclosure are described in detail hereinafter with reference to the accompanying drawings.

At present, when a liquid crystal display panel is applied in a full-screen display device, a Dual Gate technology needs to be used to fabricate the array substrate of the liquid crystal display panel.

Figure 1:
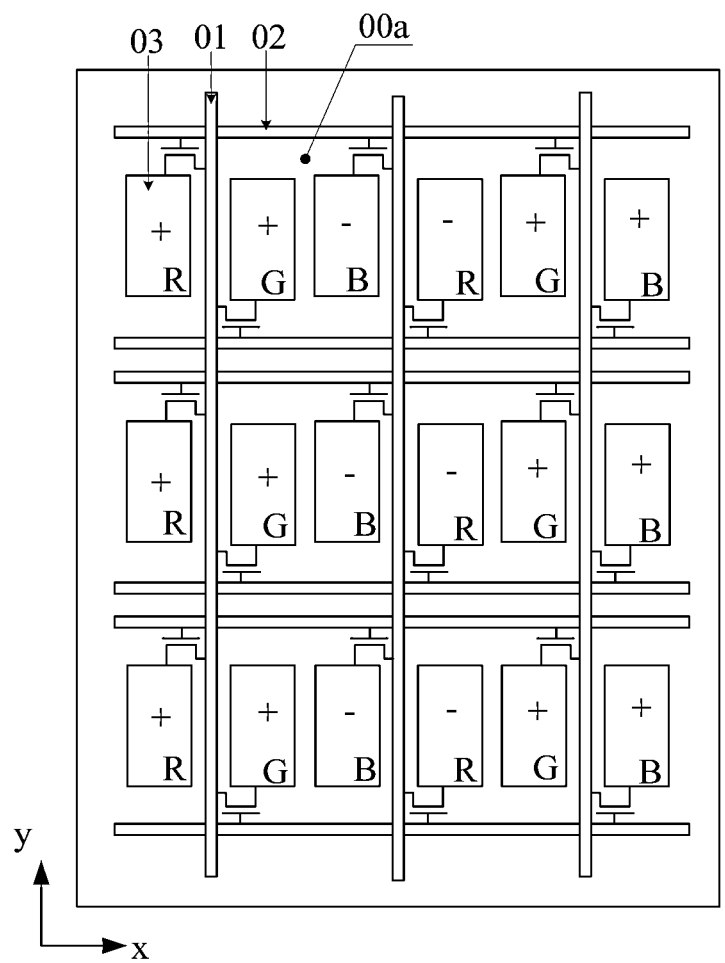
FIG. 1 is a schematic structural diagram of an array substrate prepared by a Dual Gate technology according to the related art.

Referring to FIG. 1, FIG. 1 is a schematic structural diagram of an array substrate manufactured by the Dual Gate technology according to the related art. The array substrate 00 may include a plurality of data lines 01, a plurality of gate lines 02 and a plurality of sub-pixels 03; and the gate lines 02 extend along a first direction x, and the data lines 01 extend along a second direction y. The data lines 01 and the gate lines 02 may define a plurality of pixel regions 00a; and in each pixel region 00a, two sub-pixels 03 are arranged along the first direction x. The plurality of pixel regions 00a may be arranged in multiple rows along the first direction x, and may also be arranged in multiple columns along the second direction y; and each column of pixel regions 00a may include two columns of sub-pixels 03. Two gate lines 02 are arranged between every two adjacent rows of pixel regions 00a, and one data line 01 is arranged between every two adjacent columns of pixel regions 00a.

In the array substrate prepared by the Dual Gate technology, through doubling the gate lines 02 to reduce the number of the data lines 01, the number of data leads in a non-display region of the array substrate which are electrically connected with the data lines 01 is relatively small, such that the width of the non-display region in the array substrate can be relatively small, thereby ensuring that the liquid crystal display panel prepared by such array substrate has a relatively high screen-to-body ratio.

However, when the array substrate prepared by the Dual Gate technology is assembled in the liquid crystal display panel, due to the following reasons, a Vertical line phenomenon may tend to appear during the display of the liquid crystal display panel.

In the array substrate prepared by the Dual Gate technology, the two sub-pixels 03 in a same pixel region 00a are respectively connected with the two gate lines 02 adjacent to the pixel regions 00a, and are also respectively connected with the two data lines 01 adjacent to the pixel regions 00a. The two sub-pixels 03 are two of a first sub-pixel R, a second sub-pixel G and a third sub-pixel B. The sub-pixels in a same row are arranged periodically in an order of the first sub-pixel R, the second sub-pixel G and the third sub-pixel B, and all the sub-pixels in a same column are one selected from the first sub-pixel R, the second sub-pixel G and the third sub-pixel B. For example, when the array substrate 00 is assembled in the liquid crystal display panel, the first sub-pixel R may emit red light, the second sub-pixel G may emit green light and the third sub-pixel B may emit blue light.

When the liquid crystal display panel displays images, every two adjacent data lines in the array substrate 00 need to have opposite voltage polarities. Therefore, the voltage polarities of the two sub-pixels 03 in the same pixel region 00a are opposite, and the voltage polarities of the sub-pixels 03 in the same column are the same. Thus, in space, in each row of the pixel regions, the voltage polarities of the respective first sub-pixels R are arranged periodically in an order of "+−−+", the voltage polarities of the respective second sub-pixels G are arranged periodically in an order of "++−−", and the voltage polarities of the respective third sub-pixels B are arranged periodically in an order of "−++−". However, for the same type of sub-pixels in each row of the pixel regions, the probability that every two adjacent sub-pixels have a same voltage polarity is almost 50%; and for each column of the sub-pixels, all the sub-pixels show the same voltage polarity. Thus, it is unable to average the voltage polarities of the same type of sub-pixels in the same frame of image on a space dimension, and thus bright stripes and dark stripes will appear visually, which means that the undesired Vertical line phenomenon appears.

Therefore, when the liquid crystal display panel assembled with the array substrate prepared by the Dual Gate technology would have a relatively poor display effect.

Figure 2:
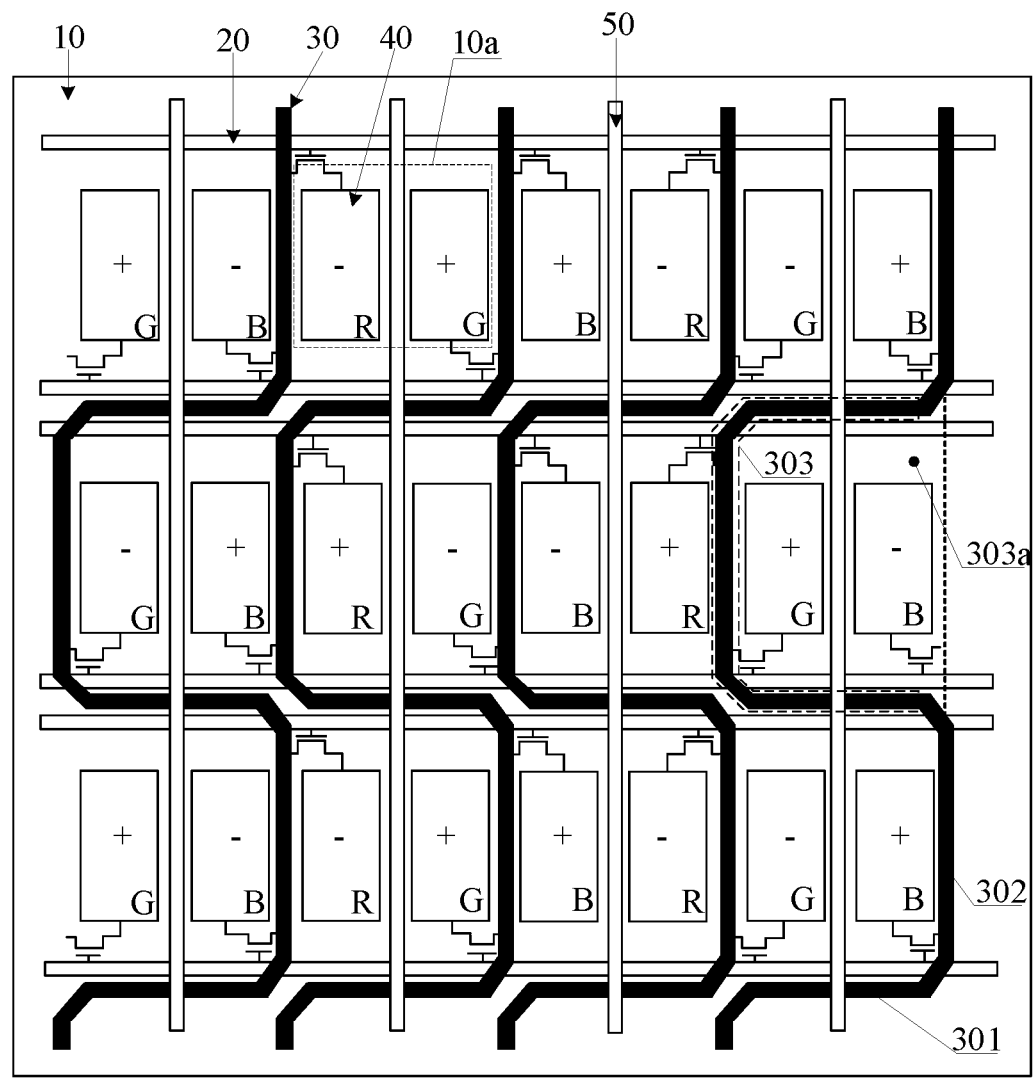
FIG. 2 is a schematic structural diagram of an array substrate according to an embodiment of the present disclosure.

Referring to FIG. 2, FIG. 2 is a schematic structural diagram of an array substrate according to an embodiment of the present disclosure. The array substrate 100 may include a base substrate 10, and a plurality of gate lines 20, a plurality of data lines 30 and a plurality of sub-pixels 40 disposed on the base substrate 10.

The gate lines 20 and the data lines 30 may define a plurality of first pixel regions 10a on the base substrate 10. The plurality of first pixel regions 10a may be arranged in multiple rows or in multiple columns. Two gate lines 20 are arranged between every two adjacent rows of first pixel regions 10a.

Figure 3:
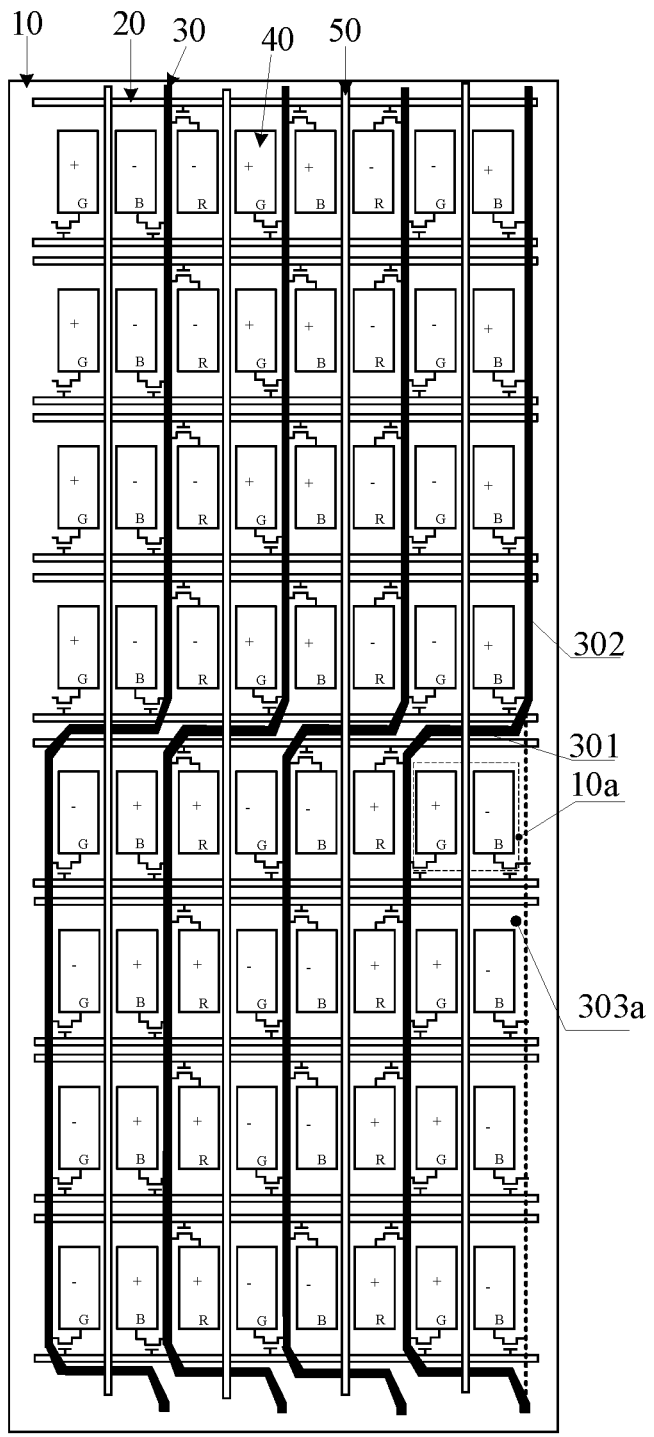
FIG. 3 is a schematic structural diagram of another array substrate according to an embodiment of the present disclosure.

The data lines 30 have a plurality of first extending parts 301 and a plurality of second extending parts 302 that are in connection, and the plurality of first extending parts 301 and the plurality of second extending parts 302 are in a one-by-one alternating arrangement. An extending direction of each first extending part 301 intersects an extending direction of every second extending part 302 which is connected with the first extending part 301. Every two adjacent first extending parts 301 and a second extending part 302 between the two adjacent first extending parts 301 in a same data line 30 constitute a bending structure 303, and a region 303a enclosed by the bending structure 303 may include at least one first pixel region 10a. For example, FIG. 2 shows an example that the region 303a enclosed by the bending structure 303 includes one first pixel region 10a. In another optional embodiment, as shown in FIG. 3, FIG. 3 illustrates an example that the region 303a enclosed by the bending structure 303 includes four first pixel regions 10a. It should be noted that when the region 303a enclosed by the bending structure 303 includes a plurality of first pixel regions 10a, an arranging direction of the plurality of first pixel regions 10a may be perpendicular to an extending direction of the gate lines 20.

In each first pixel region 10a, two sub-pixels 40 are arranged along the extending direction of the gate lines 20, and the two sub-pixels 40 are respectively connected with the two data lines 30 adjacent to the first pixel region 10a, and each sub-pixel 40 is connected with one of the two gate lines 20 which are adjacent to the sub-pixel 40.

In some embodiments of the present disclosure, for two sub-pixels 40 in one first pixel region 10a, the two sub-pixels 40 are any two of a first sub-pixel R, a second sub-pixel G or a third sub-pixel B. The sub-pixels in a same row are arranged periodically in an order of the first sub-pixel R, the second sub-pixel G and the third sub-pixel B. All the sub-pixels in a same column are one type of sub-pixels selected from the first sub-pixel R, the second sub-pixel G or the third sub-pixel B. For example, when the array substrate 100 is assembled in the liquid crystal display panel, the first sub-pixel R may emit red light, the second sub-pixel G may emit green light and the third sub-pixel B may emit blue light. It should be noted that the first sub-pixel R may also be referred to as a red sub-pixel, the second sub-pixel G may also be referred to as a green sub-pixel, and the third sub-pixel B may also be referred to as a blue sub-pixel. Under this circumstance, the sub-pixels in the same column have the same color.

In the present disclosure, when the array substrate 100 is assembled in a liquid crystal display panel and the liquid crystal display panel displays, every two adjacent data lines 30 of the plurality of data lines 30 in the array substrate 100 need to be loaded with voltages of opposite polarities. As such, for the same type of sub-pixels in each row of the pixel regions, the probability that every two adjacent sub-pixels have a same voltage polarity is still almost 50%. However, in each column of the sub-pixels, the two adjacent sub-pixels which respectively belong to two adjacent first pixel regions 10a have voltages of opposite polarities. For example, if the region 303a enclosed by the bending structure 303 includes one first pixel region 10a, every two adjacent sub-pixels 40 in each column of the sub-pixels have voltages of opposite polarities. As such, the voltage polarities of the same type of sub-pixels in the same frame of image can be effectively averaged on a space dimension, thereby reducing the probability of the occurrence of the Vertical lines, and effectively improving the display effect of the liquid crystal display panel.

As shown in FIG. 2, the above array substrate 100 may further include a plurality of touch signal lines 50 disposed on the base substrate 10. Each column of the multiple columns of the first pixel regions 10a includes two columns of sub-pixels 40, and the touch signal lines 50 are located between the two columns of sub-pixels 40 in the same column of first pixel regions 10a. In the present disclosure, through the plurality of touch signal lines 50 on the array substrate 100, the liquid crystal display panel prepared by the array substrate 100 has a touch control function. Thus, the liquid crystal display panel is enabled the touch control function without needing to separately assemble a touch panel on the liquid crystal display panel, which effectively decreases the thickness of the liquid crystal display panel having the touch function.

In summary, the array substrate provided according to an embodiment of the present disclosure includes a base substrate, and a plurality of gate lines, a plurality of data lines, a plurality of sub-pixels and a plurality of touch signal lines disposed on the base substrate. When the array substrate is used to prepare a liquid crystal display panel and the liquid crystal display panel is displaying, for the same type of sub-pixels in each row of the first pixel regions, the probability that every two adjacent sub-pixels have a same voltage polarity is still almost 50%. However, in each column of the sub-pixels, the two adjacent sub-pixels which respectively belong to two adjacent first pixel regions have voltages of opposite polarities. As such, the voltage polarities of the same type of sub-pixels in the same frame of image can be effectively averaged on a space dimension, thereby reducing the probability of the occurrence of the Vertical lines, and effectively improving the display effect of the liquid crystal display panel. In addition, the liquid crystal display panel is enabled the touch control function through the plurality of touch signal lines, there is no need to separately assemble a touch panel on the liquid crystal display panel, which effectively decreases the thickness of the liquid crystal display panel having a touch control function.

Figure 4:
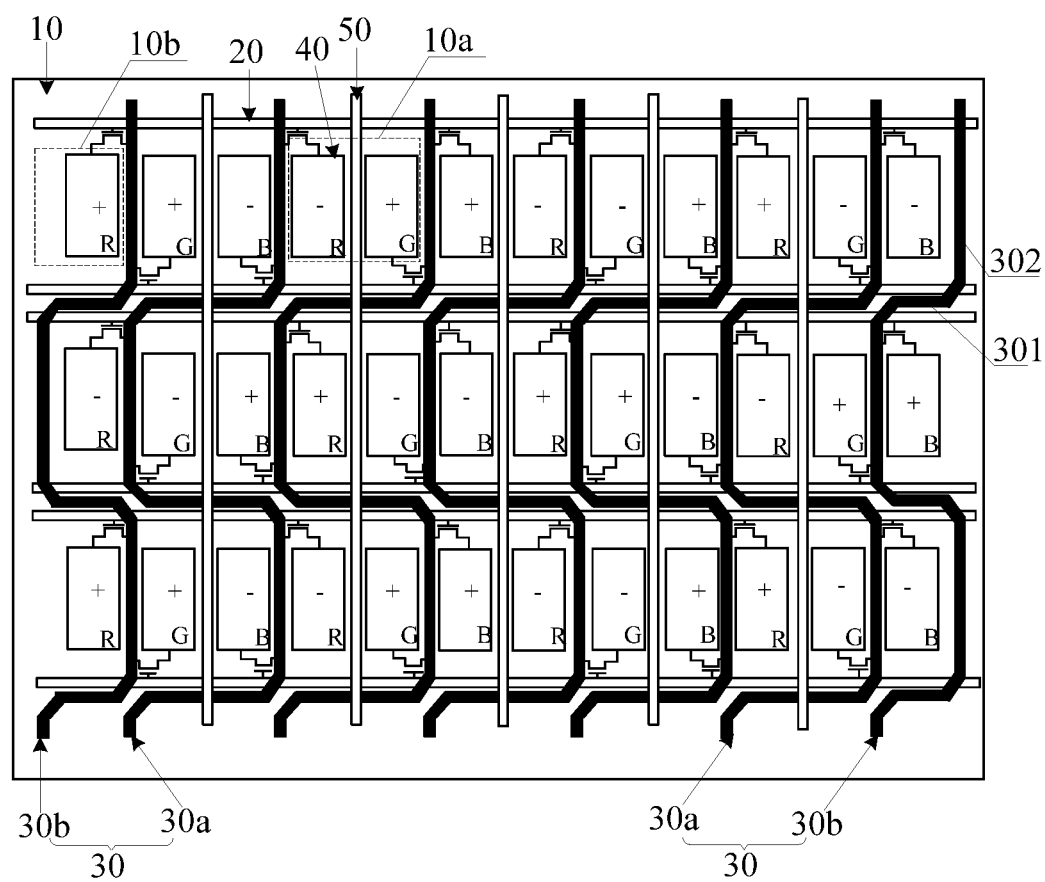
FIG. 4 is a schematic structural diagram of yet another array substrate according to an embodiment of the present disclosure.

In some embodiments of the present disclosure, as shown in FIG. 4, FIG. 4 is a schematic structural diagram of another array substrate according to an embodiment of the present disclosure. The data lines 30 and the gate lines 20 may further define a plurality of second pixel regions 10b on the base substrate 10. The plurality of second pixel regions 10b are arranged in two columns, and the multiple columns of the first pixel regions 10a are located between the two columns of the second pixel regions 10b. One sub-pixel 40 is arranged in each of the second pixel regions 10b; the sub-pixel 40 is connected with a data line 30; and the sub-pixel 40 is connected with one of the two gate lines 20 which are adjacent to the sub-pixel 40.

The plurality of data lines 30 in the array substrate 100 may be divided into a plurality of first data lines 30a and two second data lines 30b, and the plurality of first data lines 30a are located between the two second data lines 30b.

For the plurality of second extending parts 302 in the first data lines 30a, each second extending part 302 may be connected with two adjacent sub-pixels 40 respectively disposed in two different first pixel regions 10a.

For the plurality of second extending parts 302 in the second data lines 30b, a portion of the second extending parts 302 are connected with two adjacent sub-pixels 40, and one of the two adjacent sub-pixels 40 is disposed within the first pixel region 10a and the other is disposed in the second pixel region 10b; the other portion of the second extending parts 302 is not connected with the sub-pixels 40. In the second data lines 30b, the portions of second extending parts 302 which are connected with the sub-pixels 40 and the portions of the second extending parts 302 which are not connected with the sub-pixels 40 are alternately arranged.

In the present disclosure, the first extending parts 301 in the first data lines 30a need to be longer than the first extending parts 301 in the second data lines 30b. For example, the first extending parts 301 in the first data lines 30a may have a length greater than the total width of two adjacent sub-pixels 40; and the first extending parts 301 in the second data lines 30b may have a length greater than the width of one sub-pixel 40, but less than the total width of two adjacent sub-pixels 40. It should be noted that a length direction of the first extending parts 301 is parallel to a width direction of the sub-pixels 40.

Figure 5:
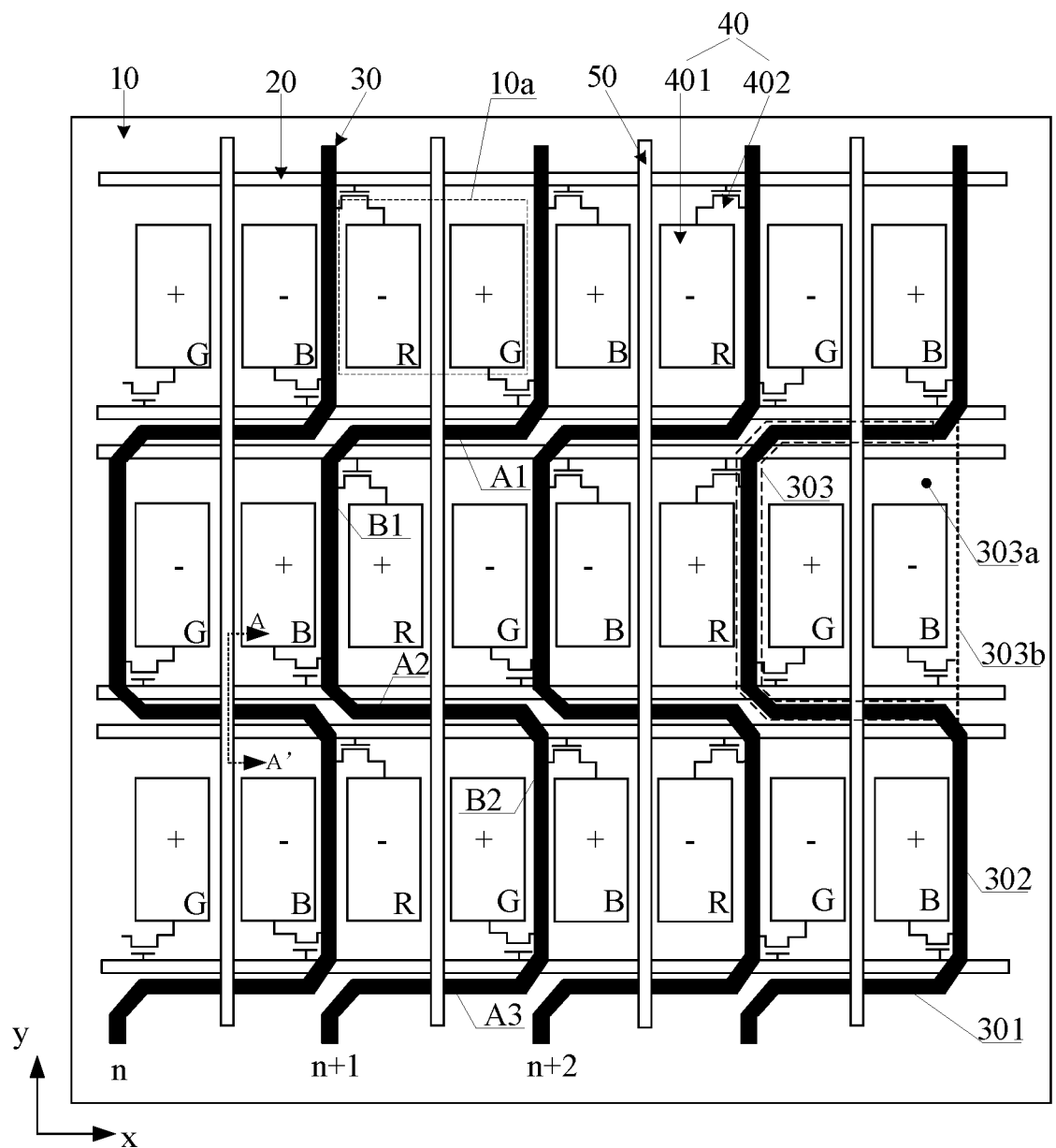
FIG. 5 is a schematic structural diagram of an array substrate according to another embodiment of the present disclosure.

In some embodiments of the present disclosure, as shown in FIG. 5, FIG. 5 is a schematic structural diagram of an array substrate according to another embodiment of the present disclosure. The plurality of first extending parts 301 and the plurality of second extending parts 302 in the same data line 30 constitute a plurality of bending structures 303. Each bending structure 303 has an opening 303b, and the orientations of the openings 303b of every two adjacent bending structures 303 are opposite. For example, the $n^{th}$ data line, the $(n+1)^{th}$ data line and the $(n+2)^{th}$ data line are three adjacent data lines 30, and for the $(n+1)^{th}$ data line, the opening 303b of the bending structure constituted by the first extending part A1, the second extending part B1 and the first extending part A2 is in an orientation towards the $(n+2)^{th}$ data line, while the opening 303b of the bending structure constituted by the first extending part A2, a second extending part B2 and the first extending part A3 is in an orientation towards the $n^{th}$ data line.

Optionally, the extending direction of the first extending parts 301 in the data lines 30 is the same as the extending direction of the gate lines 20, and the extending direction of the second extending parts 302 in the data lines 30 is perpendicular to the extending direction of the gate lines 20. As the extending direction of the gate lines 20 is usually parallel to a row direction (i.e., the first direction x) of the plurality of first pixel regions 10a and perpendicular to a column direction (i.e., the second direction y) of the plurality of first pixel regions 10a, the first extending parts 301 may extend along the first direction x and the second extending parts 302 may extend along the second direction y.

In some embodiments of the present disclosure, the first extending parts 301 of the data lines 30 are located between the two gate lines 20 between two adjacent rows of first pixel regions, and orthographic projections of the second extending parts 302 onto the base substrate 10 and orthographic projections of the gate lines 20 onto the base substrate do not overlap. Thus, a parasitic capacitance generated between the data lines 30 and the gate lines 20 can be effectively reduced.

Optionally, each of the sub-pixels 40 may include a thin film transistor 401 and a pixel electrode 402. The pixel electrode 402 may be prepared from a transparent conductive material. The thin film transistor 401 may include a first electrode, a second electrode and a gate electrode. The first electrode may be connected with one data line 30; the gate electrode may be connected with one gate line 20; and the second electrode is connected with the pixel electrode 402. The first electrode is one of a source electrode and a drain electrode, and the second electrode is the other of the source electrode and the drain electrode.

If the region 303a enclosed by each bending structure 303 includes one first pixel region 10a, when the array substrate 100 is assembled to the liquid crystal display panel and the liquid crystal display panel needs to display, the $n^{th}$ data line will periodically drive the two columns of sub-pixels connected with the $n^{th}$ data line in an order of the first sub-pixel R, the third sub-pixel B, the first sub-pixel R and the second sub-pixel G; the $(n+1)^{th}$ data line will periodically drive the two columns of sub-pixels connected with the $(n+1)^{th}$ data line in an order of the third sub-pixel B, the second sub-pixel G, the first sub-pixel R and the third sub-pixel B; and the $(n+2)^{th}$ data line will periodically drive the two columns of sub-pixels connected with the $(n+2)^{th}$ data line in an order of the first sub-pixel R, the second sub-pixel G, the third sub-pixel B and the second sub-pixel G.

In some embodiments of the present disclosure, the touch signal lines 50 in the array substrate 100 may have multiple types of structures, and the following two implementations are used as examples in the embodiments of the present disclosure.

Figure 6:
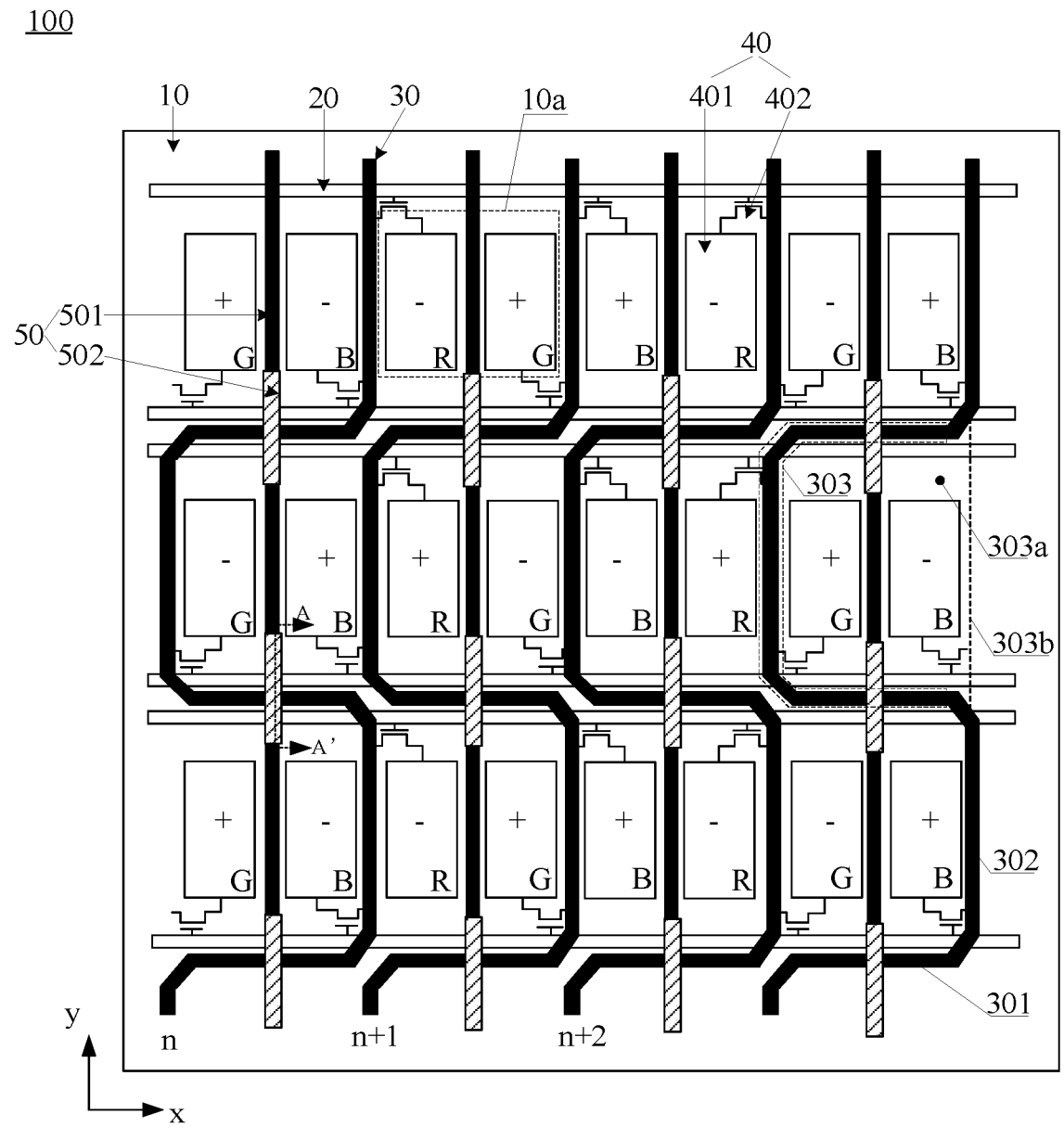
FIG. 6 is a schematic structural diagram of another array substrate according to another embodiment of the present disclosure.

In a first implementation, as shown in FIG. 6, FIG. 6 is a schematic structural diagram of another array substrate according to another embodiment of the present disclosure. The touch signal lines 50 in the array substrate 100 include first touch line segments 501 and second touch line segments 502 which are in an alternating arrangement. The extending direction of the first touch line segments 501 and the extending direction of the second touch line segments 502 are the same, and the first touch line segment 501 and the second touch line segment 502 adjacent that are adjacent are connected. The first touch line segments 501 and the data lines 30 are disposed in a same layer; and orthographic projections of the first touch line segments 501 onto the base substrate 10 and orthographic projections of the data lines 30 onto the base substrate 10 do not overlap. Because the orthographic projections of the second touch line segments 502 onto the base substrate 10 intersect the orthographic projections of the data lines 30 (the first extending parts 301 in the data lines 30) onto the base substrate 10, the second touch line segments 502 and the data lines 30 need to be disposed in different layers to prevent a short circuit from occurring between the touch signal lines 50 and the data lines 30. That is, the second touch line segments 502 and the first touch line segments 501 are disposed in different layers.

It should be noted that by disposing the first touch line segments 501 and the data lines 30 in the same layer, it means that the first touch line segments 501 and the data lines 30 are formed by a single patterning process. By disposing the second touch line segments 502 and the data lines 30 in different layers, it means that the second touch line segments 502 and the data lines 30 are not in a same film layer, and an insulating layer is disposed between the second touch line segments 502 and the data lines 30.

Figure 7:
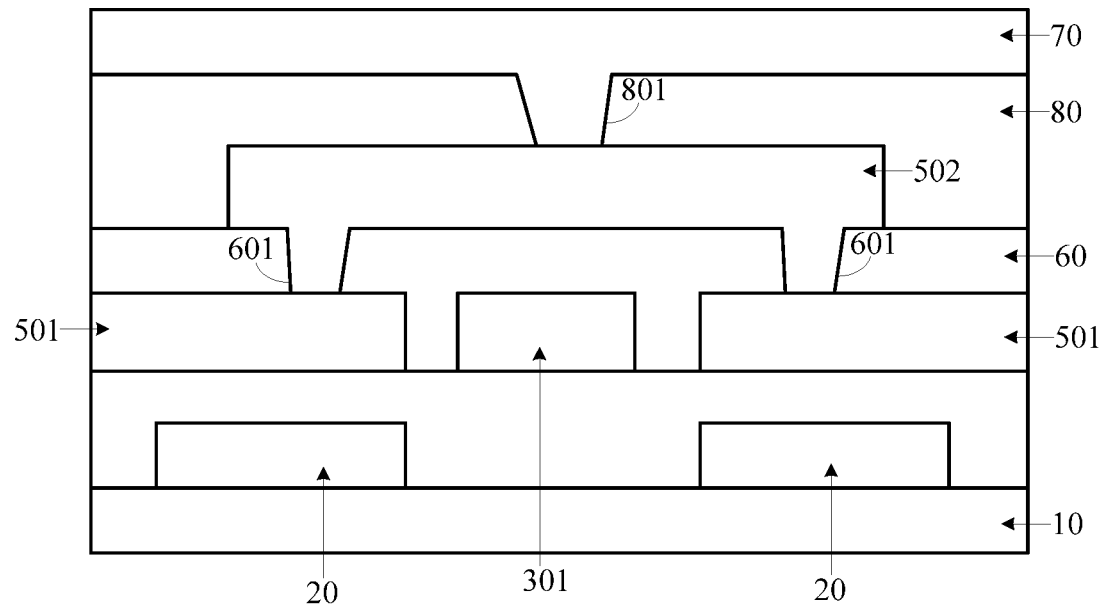
FIG. 7 is a sectional view of FIG. 6 at A-A'.

Exemplarily, referring to FIG. 7, FIG. 7 is a sectional view of FIG. 6 at A-A'. The array substrate 100 may further include a first insulating layer 60 located between the first touch line segments 501 and the second touch line segments 502. The first insulating layer 60 is provided with a plurality of first via holes 601, and adjacent first touch line segment 501 and second touch line segment 502 are connected through at least one first via hole 601.

Optionally, a material of the second touch line segments 502 may include a transparent conductive material. Thus, the aperture ratio of each sub-pixel 30 can be increased.

In a second implementation, as shown in FIG. 5, the plurality of touch signal lines 50 in the array substrate 100 are disposed in a same layer, and the touch signal lines 50 and the data lines 30 are disposed in different layers. It should be noted that by disposing the plurality of touch signal lines 50 in the same layer, it means that the plurality of touch signal lines 50 are formed by a single patterning process; and by disposing the touch signal lines 50 and the data lines 30 in different layers, it means that the touch signal lines 50 and the data lines 30 are not in the same film layer, and an insulating layer is disposed between the touch signal lines 50 and the data lines 30.

Figure 8:
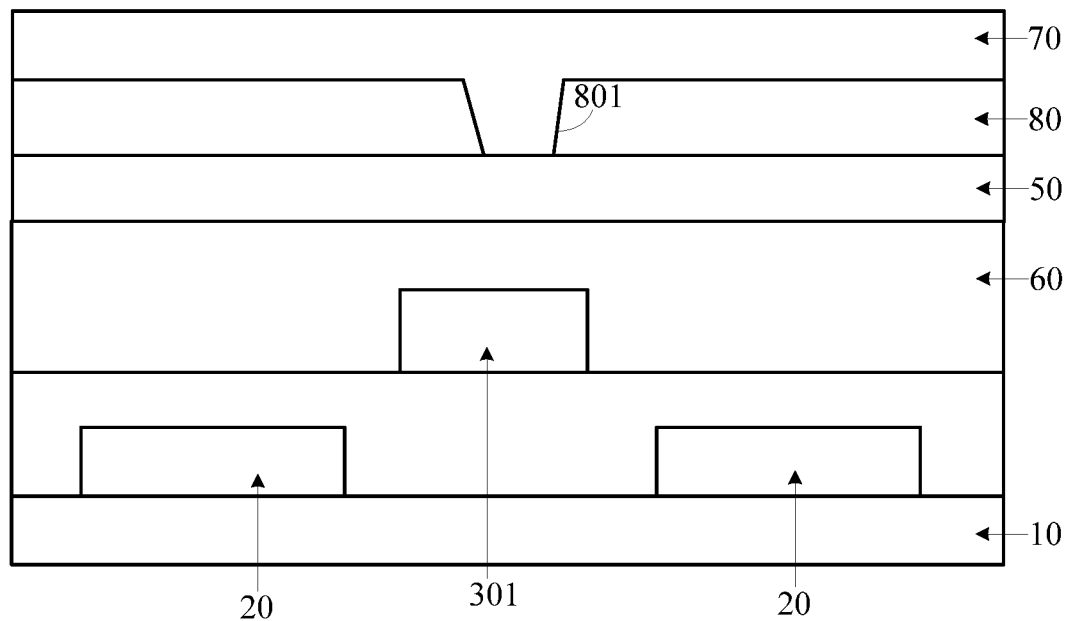
FIG. 8 is a sectional view of FIG. 5 at A-A'.

Exemplarily, as shown in FIG. 8, FIG. 8 is a sectional view of FIG. 5 at A-A'. The array substrate 100 may further include a first insulating layer 60 located between the touch signal lines 50 and the data lines 30. Optionally, a material of the touch signal lines 50 may include metal materials. As the touch signal lines 50 and the data lines 30 are disposed in different layers in the second implementation, there is no need to dispose the first via hole in the first insulating layer 60 and thus the aperture ratio of each sub-pixel 30 can be improved. In addition, in the second implementation, the material of the touch signal lines 50 is a metal material which has a relatively high conductivity and a relatively low resistivity compared with a transparent conductive material, thus the intensity of the touch signals in the touch signal lines 50 is improved effectively, and the touch performance of the array substrate 100 is further improved.

Optionally, as shown in FIG. 7 and FIG. 8, the array substrate 100 may further include a plurality of touch electrodes 70. The plurality of touch electrodes 70 are connected with the plurality of touch signal lines 50 in a one-to-one correspondence. The touch electrodes 70 may be electrodes prepared from transparent conductive materials. It should be noted that the touch control method of the array substrate 100 in the present disclosure belongs to self-capacitance mode touch control, and a reference may be made to the related art for the relevant principles of such touch control, and it is not described herein.

Exemplarily, the touch electrodes 70 and the plurality of touch signal lines 50 are disposed in different layers. It should be noted that by disposing the touch electrodes 70 and the plurality of touch signal lines 50 in different layers, it means that the touch electrodes 70 and the plurality of touch signal lines 50 are not in the same film layer, and an insulating layer is disposed between the touch electrodes 70 and the plurality of touch signal lines 50. For example, the array substrate 100 may further include a second insulating layer 80 disposed between the touch electrodes 70 and the plurality of touch signal lines 50; the second insulating layer 80 is provided with a plurality of second via holes 801; and each touch electrode 70 is connected with the corresponding touch signal line 50 through at least one second via hole 801.

Optionally, each touch electrode 70 is a block electrode; and an orthographic projection of each touch electrode 70 onto the base substrate 10 covers an orthographic projection of a plurality of pixel electrodes 402 onto the base substrate 10. For example, it is assumed that the plurality of sub-pixels in the array substrate 100 can be divided into k sub-pixel groups uniformly, and each sub-pixel group includes j×j sub-pixels, then the orthographic projection of each touch electrode 70 onto the base substrate covers the j×j pixel electrodes 402.

In some embodiments of the present disclosure, the array substrate 100 may further include common electrodes and common electrode lines. To decrease the complexity of the structure of the array substrate 100, the touch electrodes 70 in the array substrate 100 may be multiplexed as the common electrodes, and the touch signal lines 50 in the array substrate 100 may be multiplexed as the common electrode lines. That is, in the array substrate 100, the touch electrodes 70 and the common electrodes are the same electrodes, and the touch signal lines 50 and the common electrode lines are the same signal lines.

Thus, in the liquid crystal display panel prepared using the array substrate 100, when it requires the liquid crystal display panel is to display, the touch signal lines 50 need to be loaded with common electrode signals, such that the touch electrodes 70 and the pixel electrodes 402 can form a voltage difference that enables the liquid crystals to polarize; when it requires the liquid crystal display panel to perform touch control, the touch signal lines 50 need to be loaded with touch signals, thus the touch electrodes 70 are enabled to detect touch positions.

Optionally, as illustrated in FIG. 5 or FIG. 6, an extending direction of the touch signal lines 50 is perpendicular to the extending direction of the gate lines 20. That is, the touch signal lines 50 extend along the second direction y.

Optionally, as illustrated in FIG. 5 or FIG. 6, the multiple columns of first pixel regions 10a correspond to the plurality of touch signal lines 50 one by one, and each touch signal line 50 is located between the two columns of sub-pixels 40 in one column of the first pixel regions 10a which corresponds to the touch control signal line 50.

The array substrate 100 shown in FIG. 6 is an array substrate given in the above first implementation. The array substrate 100 includes a first conductive layer, a gate insulating layer 90, an active layer (not shown in the figure), a second conductive layer, a pixel electrode layer, a first insulating layer 60, a third conductive layer, a second insulating layer 80 and a fourth conductive layer, which are sequentially stacked along a direction perpendicular to and away from the base substrate 10. The first conductive layer includes a gate line 20 and gate electrodes in a thin film transistor 402; the second conductive layer includes a data line 30, first touch line segments 501, and source electrodes and drain electrodes in the thin film transistor 402; the pixel electrode layer includes a plurality of pixel electrodes 401; the third conductive layer includes second touch line segments 502; and the fourth conductive layer includes touch electrodes 70.

The array substrate 100 shown in FIG. 5 is an array substrate given in the above second implementation. The array substrate 100 includes a first conductive layer, a gate insulating layer 90, an active layer (not shown in the figure), a second conductive layer, a pixel electrode layer, a first insulating layer 60, a third conductive layer, a second insulating layer 80 and a fourth conductive layer, which are sequentially stacked along a direction perpendicular to and away from the base substrate 10. The first conductive layer includes a gate line 20 and gate electrodes in a thin film transistor 402; the second conductive layer includes a data line 30 and source electrodes and drain electrodes in the thin film transistor 402; the third conductive layer includes touch signal lines 50; and the fourth conductive layer includes the touch electrodes 70.

In summary, the array substrate provided according to an embodiment of the present disclosure includes a base substrate, and a plurality of gate lines, a plurality of data lines, a plurality of sub-pixels and a plurality of touch signal lines disposed on the base substrate. When the array substrate is used to prepare a liquid crystal display panel and the liquid crystal display panel is displaying, even for the same type of sub-pixels in each row of the first pixel regions, the probability that every two adjacent sub-pixels have a same voltage polarity is still almost 50%. However, in each column of the sub-pixels, the two adjacent sub-pixels which respectively belong to two adjacent first pixel regions have voltages of opposite polarities. As such, the voltage polarities of the same type of sub-pixels in the same frame of image can be effectively averaged on a space dimension, thereby reducing the probability of the occurrence of the Vertical lines, and effectively improving the display effect of the liquid crystal display panel. In addition, the liquid crystal display panel is enabled the touch control function through the plurality of touch signal lines, there is no need to separately assemble a touch panel on the liquid crystal display panel, which effectively decreases the thickness of the liquid crystal display panel having a touch control function.

According to some embodiments of the present disclosure, a method for manufacturing an array substrate is further provided to manufacture the array substrates 100 as shown in FIG. 2, FIG. 3, FIG. 4, FIG. 5, or FIG. 6. The method for manufacturing the array substrate 100 may include:

forming a plurality of gate lines, a plurality of data lines, a plurality of sub-pixels and a plurality of touch signal lines on a base substrate.

The data lines and the gate lines define a plurality of first pixel regions on the base substrate. The plurality of first pixel regions are arranged in multiple rows, and two gate lines are arranged between every two adjacent rows of the first pixel regions. The data lines have a plurality of first extending parts and a plurality of second extending parts that are in connection, and the plurality of first extending parts and the plurality of second extending parts are in a one-by-one alternating arrangement. An extending direction of each first extending part intersects an extending direction of every second extending part which is connected with the first extending part. In addition, every two adjacent first extending parts and a second extending part between the two adjacent first extending parts in a same data line constitute a bending structure, wherein a region enclosed by the bending structure includes at least one first pixel region. Every two adjacent data lines are loaded with voltages of opposite polarities. In each first pixel region, two sub-pixels are arranged along an extending direction of the gate lines, and the two sub-pixels are respectively connected with two data lines adjacent to the first pixel region, and each sub-pixel is connected with one of the two gate lines which are adjacent to the sub-pixel. The plurality of first pixel regions are further arranged in multiple columns; each column of the first pixel regions includes two columns of sub-pixels; and the touch signal lines are located between the two columns of sub-pixels in the same column of the first pixel regions.

In summary, in the method for manufacturing the array substrate according to some embodiments of the present disclosure, a plurality of gate lines, a plurality of data lines, a plurality of sub-pixels and a plurality of touch signal lines are formed on the base substrate. When the array substrate is used to prepare a liquid crystal display panel and the liquid crystal display panel is displaying, even for the same type of sub-pixels in each row of the first pixel regions, the probability that every two adjacent sub-pixels have a same voltage polarity is still almost 50%. However, in each column of the sub-pixels, the two adjacent sub-pixels which respectively belong to two adjacent first pixel regions have voltages of opposite polarities. As such, the voltage polarities of the same type of sub-pixels in the same frame of image can be effectively averaged on a space dimension, thereby reducing the probability of the occurrence of the Vertical lines, and effectively improving the display effect of the liquid crystal display panel. In addition, the liquid crystal display panel is enabled the touch control function through the plurality of touch signal lines, there is no need to separately assemble a touch panel on the liquid crystal display panel, which effectively decreases the thickness of the liquid crystal display panel having a touch control function.

Figure 9:
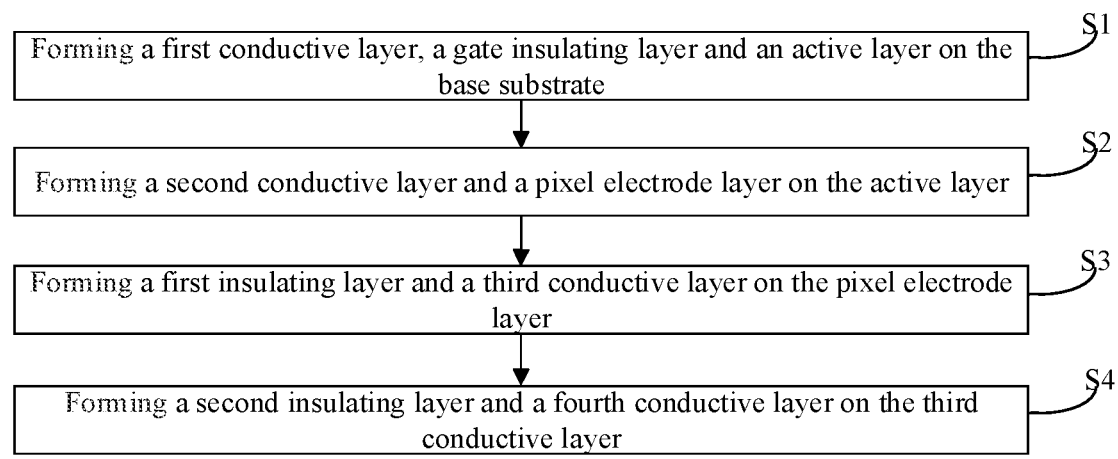
FIG. 9 is a flowchart showing a method for manufacturing an array substrate according to an embodiment of the present disclosure.

Optionally, referring to FIG. 9, FIG. 9 is a flowchart showing a method for manufacturing an array substrate according to an embodiment of the present disclosure. The method is used for manufacturing the array substrate as shown in FIG. 5 or FIG. 6. The method may include:

in S1, a first conductive layer, a gate insulating layer and an active layer are formed on the base substrate.

Optionally, the material of the first conductive layer may include metal materials such as molybdenum (Mo), copper (Cu), aluminum (Al) or alloys. The material of the gate insulating layer may include silicon oxide, silicon nitride or a mixed material of silicon oxide and silicon nitride. The material of the active layer may include polysilicon.

Exemplarily, firstly, a first conductive material layer may be formed on the base substrate by any method selected from depositing, coating, sputtering, or the like; and a single patterning process is applied to the first conductive material layer to form a first conductive layer. The first conductive layer may include gate electrodes and gate lines.

Then, a gate insulating layer and an active material layer are sequentially formed on the base substrate on which the first conductive layer has been formed by any method selected from depositing, coating, sputtering, or the like; and a single patterning process is applied to the active material layer to form an active layer.

In S2, a second conductive layer and a pixel electrode layer are formed on the active layer.

Optionally, the material of the second conductive layer may include metal materials such as molybdenum (Mo), copper (Cu), aluminum (Al) or alloys. The material of the pixel electrode layer may include transparent materials such as ITO.

Exemplarily, firstly, a second electrode material layer may be formed on the active layer by any method selected from depositing, coating, sputtering, or the like; and a single patterning process is applied to the second conductive material layer to form a second conductive layer. The second conductive layer may include source electrodes, gate electrodes and data lines.

Then, a pixel electrode material layer may be formed on the second conductive layer by any method selected from depositing, coating, sputtering, or the like; and a single patterning process is applied to the pixel electrode material layer to form a pixel electrode layer. The pixel electrode layer may include a plurality of pixel electrodes.

In S3, a first insulating layer and a third conductive layer are formed on the pixel electrode layer.

Optionally, the first insulating layer may also be referred to as a planarization layer, and the material thereof may include materials such as acrylic resin or epoxy resin.

In an implementation, when the method for manufacturing the array substrate is used to manufacture the array substrate as shown in FIG. 5, the material of the third conductive layer includes a transparent conductive material, such as ITO.

In this case, the second conductive layer formed in S2 further includes first touch line segments. Firstly, a first insulating layer may be formed on the pixel electrode layer by any method selected from depositing, coating, sputtering, or the like; and a single patterning process is applied to the first insulating layer to form a first insulating layer with a plurality of first via holes.

Then, a third conductive material layer may be formed on the base substrate which is formed with the first insulating layer by any method selected from depositing, coating, sputtering, or the like; and a single patterning process is applied to the third conductive material layer to form a third conductive layer. The third conductive layer may include second touch line segments, and the second touch line segments may be connected with the first touch line segments through at least one first via hole; and the second touch line segments and the first touch line segments may constitute touch signal lines.

In another implementation, when the method for manufacturing the array substrate is used to manufacture the array substrate as shown in FIG. 6, the material of the third conductive layer includes metal materials such as molybdenum (Mo), copper (Cu), aluminum (Al) or alloys.

In this case, firstly, a first insulating layer and a third conductive material layer may be sequentially formed on the pixel electrode layer by any method selected from depositing, coating, sputtering, or the like; and a single patterning process is applied to the third conductive material layer to form a third conductive layer. The third conductive layer may include touch signal lines.

In S4, a second insulating layer and a fourth conductive layer may be formed on the third conductive layer.

Optionally, the second insulating layer may also be referred to as a planarization layer, and the material thereof may include materials such as acrylic resin or epoxy resin. The material of the fourth conductive layer includes a transparent conductive material, such as ITO.

Exemplarily, firstly, a second insulating layer and a fourth conductive material layer may be sequentially formed on the third conductive layer by any method selected from depositing, coating, sputtering, or the like; and a single patterning process is applied to the fourth conductive material layer to form a fourth conductive layer. The fourth conductive layer may include touch electrodes.

It should be noted that each patterning process in the above embodiments may include photoresist coating, exposure, development, etching and photoresist stripping.

It can be understood by a person skilled in the art that, for the purpose of convenient and concise description, a reference may be made to the corresponding contents in the above embodiments describing the structures of the array substrate for the specific principle of the above-mentioned array substrate, which is not repeated here.

In summary, in the method for manufacturing the array substrate according to some embodiments of the present disclosure, a plurality of gate lines, a plurality of data lines, a plurality of sub-pixels and a plurality of touch signal lines are formed on the base substrate. When the array substrate is used to prepare a liquid crystal display panel and the liquid crystal display panel is displaying, even for the same type of sub-pixels in each row of the first pixel regions, the probability that every two adjacent sub-pixels have a same voltage polarity is still almost 50%. However, in each column of the sub-pixels, the two adjacent sub-pixels which respectively belong to two adjacent first pixel regions have voltages of opposite polarities. As such, the voltage polarities of the same type of sub-pixels in the same frame of image can be effectively averaged on a space dimension, thereby reducing the probability of the occurrence of the Vertical lines, and effectively improving the display effect of the liquid crystal display panel. In addition, the liquid crystal display panel is enabled the touch control function through the plurality of touch signal lines, there is no need to separately assemble a touch panel on the liquid crystal display panel, which effectively decreases the thickness of the liquid crystal display panel having a touch control function.

According to some embodiments of the present disclosure, a display device is further provided. The display device may be a liquid crystal device including a liquid crystal display panel. The liquid crystal display panel may include the array substrate as shown in FIG. 2, FIG. 3, FIG. 4, FIG. 5 or FIG. 6, a color filter substrate and a liquid crystal layer located between the array substrate and the color filter substrate.

Figure 10:
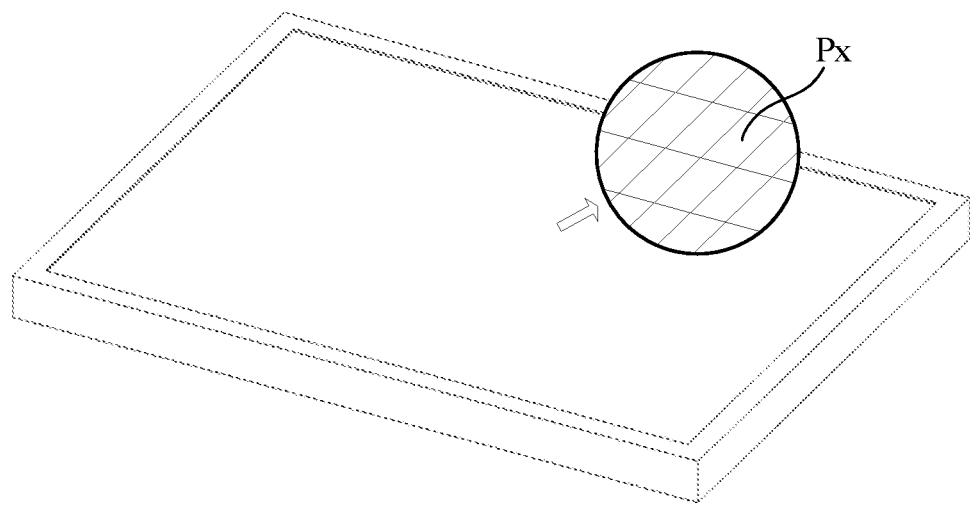
FIG. 10 is a schematic structural diagram of a display device according to an embodiment of the present disclosure.

The display device may be a product or a component with a display function, such as an electronic paper, a mobile phone, a tablet computer, a television, a display, a notebook computer, a digital photo frame, a navigator or a wearable device. As an example, FIG. 10 is a schematic structural diagram of a display device according to an embodiment of the present disclosure. The display device includes the above liquid crystal display panel, and the display region of the liquid crystal display panel includes sub-pixel regions Px arranged in rows and columns. The data lines in the above display region may be disposed between two adjacent sub-pixel regions Px, so as to transmit accessed data signals to each sub-pixel region Px.

It should be noted that in the accompanying drawings, for clarity of the illustration, the dimension of the layers and regions may be scaled up. It should be understood that when an element or layer is described as being "on" another element or layer, the described element or layer may be directly located on other elements or layers, or an intermediate layer may exist. In addition, it should be understood that when an element or layer is described as being "under" another element or layer, the described element or layer may be directly located under other elements, or more than one intermediate layer or element may exist. In addition, it should be further understood that when a layer or element is described as being arranged "between" two layers or elements, the described layer or element may be the only layer between the two layers or elements, or more than one intermediate layer or element may exist. In the whole disclosure, like reference numerals indicate like elements.

In the present disclosure, the terms "first" and "second" are merely used for description purpose, and shall not be construed as indicating or implying relative importance. Unless otherwise clearly defined, the expression "a plurality of" refers to two or more.

Described above are merely exemplary embodiments of the present disclosure, and are not intended to limit the present disclosure. Any modifications, equivalent replacements, improvements and the like made within the spirit and principles of the present disclosure should be encompassed within the scope of protection of the present disclosure.

What is claimed is:

1. An array substrate, comprising:
   a base substrate;
   a plurality of gate lines and a plurality of data lines disposed on the base substrate, wherein the plurality of data lines and the plurality of gate lines define a plurality of first pixel regions on the base substrate; the plurality of first pixel regions are arranged in multiple rows, and two of the gate lines are arranged between every two adjacent rows of first pixel regions; the data lines have a plurality of first extending parts and a plurality of second extending parts that are in connection; the plurality of first extending parts and the plurality of second extending parts are in a one-by-one alternating arrangement; an extending direction of each first extending part intersects an extending direction of every second extending part which is connected with the first extending part, and every two adjacent first extending parts and a second extending part between the two adjacent first extending parts in a same data line constitute a bending structure, wherein a region enclosed by the bending structure comprises at least one of the first pixel regions;
   two sub-pixels disposed in each first pixel region, wherein the two sub-pixels are arranged along an extending direction of the gate lines; the two sub-pixels are respectively connected with two of the data lines which are adjacent to the first pixel region; and the sub-pixels are connected with one of the two gate lines which are adjacent to the sub-pixels; and
   a plurality of touch signal lines disposed on the base substrate, wherein the plurality of first pixel regions are further arranged in multiple columns, each column of the first pixel regions comprising two columns of the sub-pixels; and the touch signal lines are disposed between two columns of the sub-pixels in a same column of the first pixel regions;
   wherein the plurality of touch signal lines are disposed in a same layer, and the plurality of touch signal lines and the data lines are disposed in different layers;
   wherein the array substrate comprises a first conductive layer, a gate insulating layer, an active layer, a second conductive layer, a pixel electrode layer, a first insulating layer, a third conductive layer, a second insulating layer and a fourth conductive layer, which are sequentially stacked along a direction perpendicular to and away from the base substrate; and
   wherein the first conductive layer comprises the gate lines and gate electrodes; the second conductive layer comprises the data lines, source electrodes and drain electrodes; the third conductive layer comprises the touch signal lines; and the fourth conductive layer comprises the touch electrodes; and
   wherein the plurality of data lines and the plurality of gate lines further define a plurality of second pixel regions on the base substrate, the plurality of second pixel regions are arranged in two columns, each of the plurality of second pixel regions comprises only one sub-pixel, and the multiple columns of first pixel regions are disposed between the two columns of the second pixel regions.

2. The array substrate according to claim 1, wherein the plurality of first extending parts and the plurality of second extending parts in a same data line constitute a plurality of the bending structures, the bending structures have openings, and the openings of every two adjacent bending structures are opposite in orientation.

3. The array substrate according to claim 1, wherein an extending direction of the first extending parts is the same with the extending direction of the gate lines; an extending direction of the second extending parts is perpendicular to the extending direction of the gate lines; and an extending direction of the touch signal lines is perpendicular to the extending direction of the gate lines.

4. The array substrate according to claim 3, wherein an orthographic projection of the first extending parts onto the base substrate and an orthographic projection of the gate lines onto the base substrate do not overlap.

5. The array substrate according to claim 4, wherein the first extending parts are disposed between two gate lines between two adjacent rows of the first pixel regions.

6. The array substrate according to claim 1, wherein the array substrate further comprises a plurality of touch electrodes, wherein the plurality of touch electrodes are connected with the plurality of touch signal lines in a one to one correspondence.

7. The array substrate according to claim 6, wherein the touch electrodes and the plurality of touch signal lines are disposed in different layers; the array substrate further comprises a second insulating layer disposed between the touch electrodes and the plurality of touch signal lines; the second insulating layer is provided with a plurality of second via holes; and each of the touch electrodes is connected with the corresponding touch signal line through at least one of the second via holes.

8. The array substrate according to claim 7, wherein the touch electrodes are block electrodes; the sub-pixels comprise pixel electrodes; and an orthographic projection of the touch electrode onto the base substrate covers an orthographic projections of the plurality of pixel electrodes onto the base substrate.

9. The array substrate according to claim 6, wherein the touch electrodes are multiplexed as common electrodes in the array substrate; and the touch signal lines are multiplexed as common electrode lines in the array substrate.

10. The array substrate according to claim 1, wherein the multiple columns of first pixel regions and the plurality of touch signal lines are in a one-to-one correspondence; and each of the touch signal lines is located between two columns of sub-pixels of one column of first pixel regions which corresponds to the touch signal line.

11. The array substrate according to claim 1, wherein the region enclosed by the bending structure comprises a plurality of first pixel regions, and an arrangement direction of the plurality of first pixel regions is perpendicular to the extending direction of the gate lines.

12. The array substrate according to claim 1, wherein the two sub-pixels disposed in each of the first pixel regions are respectively two sub-pixels among a red sub-pixel, a green sub-pixel or a blue sub-pixel; the sub-pixels in a same row are arranged periodically in an order of the red sub-pixel, the green sub-pixel and the blue sub-pixel; and the sub-pixels in a same column have a same color.

13. The array substrate according to claim 1, wherein each of the sub-pixels comprises a thin film transistor and a pixel electrode; and the thin film transistor comprises a first electrode, a second electrode, and a gate electrode; the first electrode is connected with one of the data lines; the second electrode is connected with the pixel electrode; and the gate electrode is connected with one of the gate lines.

14. A display device, comprising:
an array substrate, a color filter substrate and a liquid crystal layer located between the array substrate and the color filter substrate, wherein the array substrate comprises:
a base substrate;
a plurality of gate lines and a plurality of data lines disposed on the base substrate, wherein the plurality of data lines and the plurality of gate lines define a plurality of first pixel regions on the base substrate; the plurality of first pixel regions are arranged in multiple rows, and two of the gate lines are arranged between every two adjacent rows of first pixel regions; the data lines have a plurality of first extending parts and a plurality of second extending parts that are in connection; the plurality of first extending parts and the plurality of second extending parts are in a one-by-one alternating arrangement; an extending direction of each first extending part intersects an extending direction of every second extending part which is connected with the first extending part, and every two adjacent first extending parts and a second extending part between the two adjacent first extending parts in a same data line constitute a bending structure, wherein a region enclosed by the bending structure comprises at least one of the first pixel regions;
two sub-pixels disposed in each first pixel region, wherein the two sub-pixels are arranged along an extending direction of the gate lines; the two sub-pixels are respectively connected with two of the data lines which are adjacent to the first pixel region; and the sub-pixels are connected with one of the two gate lines which are adjacent to the sub-pixels; and
a plurality of touch signal lines disposed on the base substrate, wherein the plurality of first pixel regions are further arranged in multiple columns, each column of the first pixel regions comprising two columns of the sub-pixels; and the touch signal lines are disposed between two columns of the sub-pixels in a same column of the first pixel regions; and
wherein the plurality of touch signal lines are disposed in a same layer, and the plurality of touch signal lines and the data lines are disposed in different layers;
wherein the array substrate comprises a first conductive layer, a gate insulating layer, an active layer, a second conductive layer, a pixel electrode layer, a first insulating layer, a third conductive layer, a second insulating layer and a fourth conductive layer, which are sequentially stacked along a direction perpendicular to and away from the base substrate; and
wherein the first conductive layer comprises the gate lines and gate electrodes; the second conductive layer comprises the data lines, source electrodes and drain electrodes; the third conductive layer comprises the touch signal lines; and the fourth conductive layer comprises the touch electrodes; and
wherein the plurality of data lines and the plurality of gate lines further define a plurality of second pixel regions on the base substrate, the plurality of second pixel regions are arranged in two columns, each of the plurality of second pixel regions comprises only one sub-pixel, and the multiple columns of first pixel regions are disposed between the two columns of the second pixel regions.

* * * * *